United States Patent [19]

Werner et al.

[11] Patent Number: 4,798,851

[45] Date of Patent: Jan. 17, 1989

[54] PROCESS FOR THE PREPARATION OF ELASTIC, NONCELLULAR OR CELLULAR POLYURETHANE- OR POLYURETHANE-POLYUREA MOLDED ARTICLES

[75] Inventors: Frank Werner, Neustadt; Joachim Streu, Wachenheim; Herbert Mueller, Frankenthal, all of Fed. Rep. of Germany

[73] Assignee: BASF Aktiengesellschaft, Ludwigshafen, Fed. Rep. of Germany

[21] Appl. No.: 36,875

[22] Filed: Apr. 9, 1987

[30] Foreign Application Priority Data

Apr. 23, 1986 [DE] Fed. Rep. of Germany ....... 3613650

[51] Int. Cl.$^4$ ............................................. C08G 18/30
[52] U.S. Cl. .................................... 521/137; 521/138; 521/163; 521/172; 521/176; 528/60; 528/64; 528/66; 528/81; 528/83
[58] Field of Search ............... 521/137, 138, 163, 172, 521/176; 528/60, 64, 66, 81, 83

[56] References Cited

U.S. PATENT DOCUMENTS 4,376,834  3/1983  Goldwasser et al. ................. 528/60
4,636,531  1/1987  Schmidt et al. ...................... 521/163

Primary Examiner—John Kight
Assistant Examiner—S. A. Acquah
Attorney, Agent, or Firm—Bill C. Panagos

[57] ABSTRACT

The invention relates to a process for the preparation of elastic, noncellular or cellular polyurethane molded articles or polyurethane-polyurea molded articles through reactions of (a) an organic polyisocyanate,
(b) a polyester polyol having a hydroxyl number of from about 25 to 100 and an acid number of less than 2, prepared through the polycondensation of organic dicarboxylic acids with at least one polyoxytetramethylene glycol having a molecular weight of from about 162 to 600, or a mixture comprised of the said polyoxytetramethylene glycols with aliphatic diols and/or polyoxyalkylene glycols having a molecular weight of from about 106 to 1000,
(c) a chain extending agent in the presence of
(d) a catalyst and, optionally,
(e) a blowing agent,
(f) an auxiliary agent and/or additive.

5 Claims, No Drawings

PROCESS FOR THE PREPARATION OF ELASTIC, NONCELLULAR OR CELLULAR POLYURETHANE- OR POLYURETHANE-POLYUREA MOLDED ARTICLES

BACKGROUND OF THE INVENTION

1. Field of the Invention

This invention relates to the preparation of low viscosity polyester polyols which are liquid at room temperature and to the use of these polyols in the preparation of hydrolysis-resistant, noncellular or cellular polyurethane and/or polyurethane-polyurea molded articles, particularly shoe soles, having improved mechanical properties.

This invention further relates to using a polyoxytetramethylene glycol or a mixture of polyoxyalkylene glycols having a molecular weight or average molecular weight of from about 162 to 600 as an initial component for the polycondensation of polyesters and processing the polyester into molded articles.

2. Description of the Related Art

The preparation of elastic, noncellular or cellular isocyanate addition polymer molded articles, defined as polyurethane molded articles, or polyurethanepolyurea molded articles, using the isocyanate addition polymerization process with the help of low pressure- or high pressure technology is well known from numerous patent and literature publications.

U.S. Pat. No. 3,099,516, (DE AS No. 11 96 864) discloses a method of forming elastic, as well as rigid, polyurethanes, as well as all modifications lying there between. The process includes foaming compounds possessing hydroxyl groups together with polyisocyanates in the presence of blowing agents and catalysts. The extent of rigidity or elasticity of the resulting polyurethane is governed by the selection of the suitable polyesters possessing hydroxyl groups, polyethers, polyether esters, polyester amides, or other hydroxyl containing material, and reacting this with the desired organic polyisocyanate. Chain extending agents, such as diamines or glycols, may also be used.

The preparation of optionally cellular polyurethane elastomers using polyester polyols as higher molecular weight polyhydroxyl compounds is likewise known to those skilled in the art.

For example, optionally cellular polyurethane elastomers are prepared using a low pressure process according to EP A No. 00 17 060 through reactions of organic polyisocyanates, polyester polyols obtained through polycondensation of organic dicarboxylic acids with a 1,4-butanediol-, 1,5-pentanediol-, 1,6-hexanediol-mixture and chain extending agents.

U.S. Pat. No. 4,218,543 (DE A No. 26 951) discloses the preparation of optionally cellular, elastic molded articles, which have a dense surface layer, from polyurethane-polyurea elastomers using the high pressure process. The process includes forming the polyurethane-polyurea elastomers by the reaction of organic polyisocyanates and polyhydroxyl compounds, such as polyester polyols and aromatic di- and/or polyamines which are optionally substituted by alkyl groups in the ortho position relative to the amino groups. The elastomer so formed is then subjected to a one-shot reaction molding technique to form the molded article.

Among the disadvantages in the processing of polyester polyols and isocyanates into polyurethane polymer molded articles using low pressure and high pressure processes are the higher melting points of the polyester polyols, of about 50° C. and higher, and their higher viscosities compared to polyether polyols, thereby requiring higher processing temperatures. Polyester polyols also generally possess poor miscibility with other starting components. Another disadvantage is the limited hydrolysis stability of the polyurethane and polyurethane-polyurea elastomers prepared when using polyester polyols as polyhydroxyl compounds.

SUMMARY OF THE INVENTION

This invention relates to a process for the preparation of elastic, noncellular or preferably cellular isocyanate addition polymer molded articles, defined as polyurethane molded articles and polyurethane-polyurea molded articles, by the reaction of (a) an organic polyisocyanate,
(b) a higher molecular weight polyester polyol,
(c) a chain extending agent in the presence of
(d) a catalyst, and optionally
(e) a blowing agent, and
(f) an auxiliary agent and/or additive wherein the organic polyisocyanate (a) is selected from the group consisting of aliphatic, cycloaliphatic, araliphatic, aromatic isocyanates, and mixtures thereof; the polyester polyol (b) is selected from the group consisting of polyester polyols having an acid number less than about 2 and a hydroxyl number of from about 25 to 100, and mixtures thereof; the chain extending agent (c) is a difunctional organic compound selected from the group consisting of primary aromatic diamines whose primary amino groups are sterically hindered with respect to reaction with polyisocyanates by at least one ortho-position alkyl substituent to each amino group, secondary aromatic diamines, multivalent alcohols and/or polyoxyalkalene polyols having molecular weights less than 500, and mixtures thereof. Thus, the chain extending agent may also function as a crosslinking agent; the catalysts are compounds which strongly accelerate the reaction of the polyester polyols and the chain extender with the polyisocyanate, and (d), (e) and (f) as are well known in the art. As used herein, the term isocyanate addition polymer shall be taken to include those addition polymers containing urethane linkages and both urethane and urea linkages.

DETAILED DESCRIPTION OF THE PREFERRED EMBODIMENT

The present invention is a process for the preparation of elastic, noncellular or preferably cellular polyurethane or polyurethane-polyurea molded articles by the reaction of (a) an organic polyisocyanate,
(b) a higher molecular weight polyester polyol,
(c) a chain extending agent in the presence of
(d) a catalyst, and, optionally
(e) a blowing agent and
(f) an auxiliary agent and/or additive wherein the polyester polyol (b) has a hydroxyl number of from about 25 to 100 and an acid number less than 2 and is prepared through the polycondensation of organic dicarboxylic acids and at least one polyoxytetramethylene glycol having a molecular weight of from about 162 to 600.

By using at least one polyoxytetramethylene glycol having an average molecular weight from about 162 to 600, or mixtures thereof, and an organic dicarboxylic acid in the polycondensation procedure, hydrolysis resistant, high molecular weight, low viscosity polyester diols are obtained, which are easily miscible with the other initial components. These can be processed at room temperature into isocyanate polyurethane addition polymer molded articles having excellent hydrolysis stability and good mechanical properties.

The organic polyisocyanate (a) may be selected from the group consisting of aliphatic, cycloaliphatic, araliphatic, aromatic isocyanates and mixtures thereof. Individual examples are: alkylene diisocyanates having from about 4 to 12 carbon atoms in the alkylene radical, like 1,12-dodecandiisocyanate, tetramethylene-1,4-diisocyanate and preferably hexamethylene-1,6-diisocyanate; cycloaliphatic diisocyanates like 1,3-cyclohexane and 1,4-diisocyanate and mixtures thereof, 1-isocyanato-3,3,5-trimethyl-5-isocyanatomethyl-cyclohexane (isophorone-diisocyanate), 2,4- and 2,6-hexahydrotoluylene-diisocyanate, as well as the corresponding isomeric mixtures 4,4'-, 2,2'- and 2,4'-dicyclohexyl methane diisocyanate as well as the corresponding isomeric mixtures thereof and preferably aromatic di- and polyisocyanates, like 4,4'-, 2,4'- and 2,2'-diisocyanato-diphenylmethane and the corresponding isomeric mixtures thereof, 2,4- and 2,6-diisocyanato-toluene and the corresponding isomeric mixtures thereof, 1,5-diisocyanatonaphthalene, polyphenyl-polymethylene polyisocyanates, 2,4-6-triisocyanato-toluene and preferably mixtures of diphenylmethane diisocyanates and polyphenyl-polymethylene-polyisocyanates (crude MDI). The di- and polyisocyanates can be used individually or as mixtures.

The so-called modified multivalent isocyanates, that is, products which are obtained through chemical reactions of the above mentioned di- and/or polyisocyanates are also used. Examples of modified organic di- and polyisocyanates are: polyisocyanates possessing carbodiimide groups according to DE PS No. 1 092 007, isocyanates having allophanate groups, as described in British Pat. No. 994,890, in Belgian Pat. No. 761,626 and in NL-OS No. 71 02 524, polyisocyanates having isocyanurate groups, as described in DE-PS No. 1 022 789, 1 222 067 and 1 027 394 as well as in DE-OS No. 1 929 034 and 2 004 048, polyisocyanates possessing urethane groups as described in Belgian Pat. No. 752,261 or in U.S. Pat. No. 3,394,164, polyisocyanates possessing acylated urea groups, as described in DE-PS No. 1 230 778, polyisocyanates having biuret groups as described in DE-PS No. 1 101 394 and in GB-PS No. 889,050; polyisocyanates prepared through telomerization reactions, as disclosed in Belgian Pat. No. 723,640, polyisocyanates possessing ester groups as described in GB-PS No. 965,474 and 1,072,956, in U.S. Pat. No. 3,567,765 and in DE-PS No. 1 231 688. The di- and/or polyisocyanates may be used individually or as mixtures.

Polyisocyanates containing urethane groups are most preferred for use according to this invention. Examples include modified polyisocyanates formed by reacting an excess of polyisocyanate with lower molecular weight linear or branched alkane diols, dialkylene glycols or polyoxyalkylene glycols having molecular weights up to about 3000 based on ethylene oxide, 1,2-propylene oxide or their mixtures, modified 4,4'- and/or 2,4'-diphenylmethane diisocyanate or 2,4- and/or 2,6-toluylene diisocyanate, polyisocyantes containing carbodiimide groups and/or isocyanurate rings, based on 4,4'-, 2,4'-diphenylmethane diisocyanate, 2,4- and/or 2,6-toluylene diisocyanate, and particularly 4,4'-diphenylmethane diisocyanate, mixtures of 2,4'- and 4,4'-diphenylmethane diisocyanate, toluylene diisocyanates, mixtures of diphenylmethane diisocyanates and polyphenyl-polymethylene polyisocyanates (crude MDI) and mixtures of toluylene diisocyanates and crude MDI.

Quasi-prepolymers having an NCO content of from about 15 to 30 weight percent, preferably from about 18 to 23 weight percent based on the entire weight are useful as organic polyisocyanates. These are prepared through reactions of 4,4'-diphenylmethane diisocyanate with at least one di- to trifunctional polyester polyol, preferably a polyester diol having a hydroxyl number of from about 30 to 300, and most preferably from about 45 to 60, or a mixture comprised of a polyester diol having a hydroxyl number of from about 30 to 300 and at least one alkane diol having from about 2 to 12 carbon atoms in the alkylene radical.

The polyester polyol (b) used according to this invention possesses a hydroxyl number of from about 25 to 100, and preferably from about 40 to 70, and an acid number less than about 2, and preferably from about 0.1 to 1.5. The polyester polyols are liquid and may have a molecular weight of about 1100 to 4500, calculated from the functionality and hydroxyl number of the polyester polyol. Those skilled in the art understand the formula to calculate the molecular weight given these other parameters. The polyol is prepared through the polycondensation of an organic dicarboxylic acid having from about 2 to 15 carbon atoms, preferably aliphatic dicarboxylic acids having from about 2 to 12, and most preferably from about 4 to 6 carbon atoms, and at least one polyoxytetramethylene glycol having a molecular weight of from about 162 to 600, preferably from about 200 to 300 and most preferably from about 240 to 280. A single polyoxytetramethylene glycol can be used, however, polyoxytetramethylene glycol mixtures having average molecular weights in the above stated range are preferably used. Suitable diol components are mixtures comprised of at least one polyoxytetramethylene glycol and at least one aliphatic diol having from about 2 to 12, preferably from about 4 to 6 carbon atoms in the alkylene radical and/or polyoxyalkylene glycol having a molecular weight of from about 106 to 1000, preferably from about 106 to 400. Suitable dicarboxylic acids are succinic acid, glutaric acid, adipic acid, subaric acid, azelaic acid, sebacic acid, decanedicarboxylic acid, maleic acid and fumaric acid. The dicarboxylic acids can be used both individually and as mixtures with one another.

In place of the free dicarboxylic acids, the corresponding dicarboxylic acid derivatives can also be used. Examples include, dicarboxylic esters of alcohols having from about 1 to 4 carbon atoms or dicarboxylic anhydride. Dicarboxylic mixtures comprised of succinic, glutaric and adipic acids in quantity ratios of from about 20–35; 35–50; 20–32 parts by weight and particularly adipic acid are the preferred dicarboxylic mixtures. The polyoxytetramethylene glycols can be prepared using conventional processes. However, those products which have been obtained through cationic polymerization of tetrahydrofuran in the presence of Lewis acids, such as antimony pentachloride, boron trifluoride-etherate and others; or bleaching earth used as catalyst in the presence of carboxylic anhydrides, preferably acetic anhydride and optionally alcohols having from about 1 to 4 carbon atoms, followed by subsequent saponification of the intermediate polyoxytetramethylene-glycol carboxylic esters, are preferred.

Examples of alkane diols and polyoxyalkylene glycols having molecular weights from about 106 to 1000 are ethanediol, 1,2- and 1,3-propanediol, 2,2-dimethyl-1,3-propanediol, 1,4-butanediol, 1,5-pentanediol, 1,6-hexanediol, polyoxyethylenediol, and mixtures thereof, polyoxyethylene glycols selected from diethylene glycol, triethylene glycol, tetraethylene glycol, and mixtures thereof, polyoxypropylene glycols selected from dipropylene glycol and tripropylene glycol and polyoxypropylene-polyoxyethylene glycols, and mixtures thereof. The diols and glycols can be used individually or in mixtures.

Mixtures comprised of 1,4-butanediol, 1,5-pentanediol, and 1,6-hexanediol are preferred.

The preferred polyester polyols are polyester diols, which are prepared through the polycondensation of (a) from about 10 to 70 parts by weight, preferably from about 20 to 50 parts by weight of at least one organic, preferably aliphatic dicarboxylic acid and especially adipic acid, (b) from about 1 to 90 parts by weight, preferably from about 10 to 90 parts by weight of at least one polyoxytetramethylene glycol having a molecular weight of from about 162 to 600, preferably from about 200 to 300, and (c) from about 0 to 50 parts by weight, preferably from about 0 to 30 parts by weight of at least one aliphatic diol having from about 2 to 12 carbon atoms, preferably 1,4- butanediol, and/or a polyoxyalkylene glycol having a molecular weight of from about 106 to 1000 and polyester diols prepared through the polycondensation of adipic acid and at least one polyoxytetramethylene glycol having a molecular weight of from about 200 to 300 or a mixture comprised of at least one polyoxytetramethylene glycol having a molecular weight of from about 200 to 300 and 1,4-butanediol.

The polyester polyol used according to this invention is prepared in a conventional manner by the poycondensation of initial materials at temperatures of from about 100° to 250° C., and preferably from about 150° to 220° C., whereby the final phase of the reaction is polycondensed under reduced pressure. The polycondensation can optionally be carried out in the presence of esterification catalysts such as organic titanium or tin compounds and/or water entrainers, such as benzene, toluene, xylene and chlorobenzene, and mixtures thereof, for the azeotropic distillation of the condensate.

The chain extending agent (c) is at least one of the difunctional organic compounds selected from the group consisting of (ci) primary aromatic diamines, whose primary amino groups are sterically hindered with respect to reaction with polyisocyanates by at least one alkyl substituent ortho to each amino group, (cii) secondary aromatic diamines and (ciii) multivalent and, preferably, divalent alcohols and/or polyoxyalkylene polyols having molecular weights lower than about 500, and preferably of from about 62 to 300, or mixtures of (ci), (cii) and (ciii).

The materials listed in (ci), (cii) and (ciii) may be used individually or as mixtures. The preferred primary amomatic diamines (ci) are alkyl substituted meta-phenylenediamines having the structural formulas

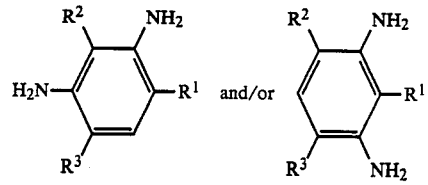

in which $R^1$ is a hydrogen atom or linear or branched alkyl radical having from about 1 to 12 carbon atoms, preferably from about 1 to 6 carbon atoms, and $R^2$ and $R^3$, which may be the same or different, are linear or branched alkyl radicals having from about 1 to 4 carbon atoms, selected from the group consisting of a methyl-, an ethyl-, a propyl-, an isopropyl-, a butyl- or a sec-butyl-radical, and mixtures thereof.

$R^1$ is preferably an alkyl radical in which the branched position rests on the $C_1$ carbon atom. Along with hydrogen the following radicals are examples of alkyl radicals $R^1$: methyl-, ethyl-, n- and isopropyl-, butyl-, hexyl-, octyl-, decyl-, 1-methyl-octyl-, 2-ethyl-octyl-, 1-methyl-hexyl-, 1,1-dimethyl-pentyl-, 1,3,3-trimethyl-hexyl-, 1-ethylpentyl-, 2-ethylpentyl- and preferentially cyclohexyl-, 1-methyl-n-propyl-, tert-butyl-, 1-ethyl-n-propyl-, 1-methyl-n-butyl- and 1,1-dimethyl-n-propyl radicals, and mixtures thereof.

Examples of alkyl-substituted m-phenylenediamines are: 2,4-dimethyl-, 2,4-diethyl-, 2,4-diisopropyl-, 2,4-diethyl-6-methyl-, 2-methyl-4,6-diethyl-, 2,4,6-triethyl-, 2,4-dimethyl-6-cyclohexyl-, 2-cyclohexyl-4,6-diethyl-, 2-cyclohexyl-2,6-diisopropyl-, 2,4-dimethyl-6-(1-ethyl-n-propyl)-, 2,4-dimethyl-6(1,1-dimethyl-n-propyl)- and 2-(1-methyl-n-butyl)-4,6-dimethyl-1,3-phenylenediamine, and mixtures thereof.

Other proven alkyl substituted diamino-diphenylmethanes are, for example, 3,3'-di- and 3,3',5,5'-tetra-n-alkyl substituted 4,4'-diamino-di-phenylmethanes such as (3,3'-diethyl-, 3,3',5,5'-tetraethyl- and 3,3',5,5'-tetra-n-propyl-4,4'-diamino-diphenylmethane, and mixtures thereof.

Preferred for use are diamino- diphenylmethanes having the structural formula

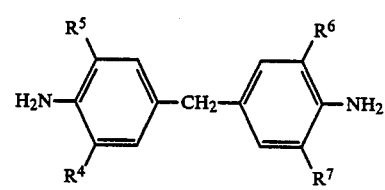

in which $R^4$, $R^5$, $R^6$, and $R^7$ are the same or different and represent a methyl, ethyl, propyl, isopropyl, sec-butyl and tertiary butyl radical, whereby, however, at least one of the radicals must be an isopropyl or sec-butyl radical. The alkyl substituted 4,4'-diamino, di-phenylmethanes can also be used in a mixture with isomers having the following structural formulas

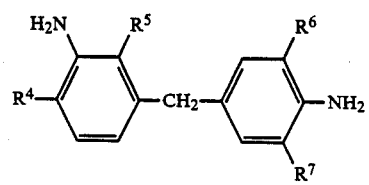

-continued
and/or

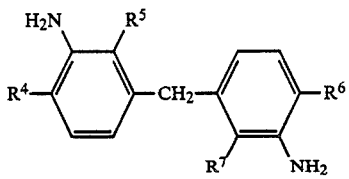

whereby $R^4$, $R^5$, $R^6$ and $R^7$ have the above stated meaning.

Examples are: 3,3',5-trimethyl-5'-isopropyl-, 3,3',5-triethyl-5'-isopropyl-,3,3',5-trimethyl-5'-sec-butyl-, 3,3',5-triethyl-5'-sec-butyl-4,4'-diamino-diphenylmethane, 3,3'-dimethyl-5,5'-diisopropyl-, 3,3'-diethyl-5,5'-diisopropyl-, 3,3'-dimethyl-5,5'-di-sec-butyl-, 3,3'-diethyl-5,5'-di-sec-butyl-, 3,5'-dimethyl-3',5'-diisopropyl-, 3,5-diethyl-3',5'-diisopropyl-, 3,5-dimethyl-3',5'-di-sec-butyl-,3,5-diethyl-3,5'-di-sec-butyl-4,4'-diamino-diphenylmethane, 3-methyl-3',5,5'-triisopropyl-, 3-ethyl-3',5,5'-triisopropyl-, 3-methyl-3',5,5'-tri-sec-butyl-, 3-ethyl-3',5,5'-tri-sec-butyl-4,4'diamino-diphenylmethane, 3,3'-diisopropyl-5,5'-di-sec-butyl-, 3,5-diisopropyl-3',5'-di-sec-butyl-, 3-ethyl-5-sec-butyl-3',5'-diisopropyl-, 3-methyl-5-tert.-butyl-3',5'-diisopropypl-, 3-ethyl-5-sec-butyl-3'-methyl-5'-tert-butyl-,3,3',5,5'-tetra-isopropyl- and 3,3',5,5'-tetra-sec-butyl-4,4'-diamino-diphenylmethane, and mixtures thereof.

Preferably used are the following primary aromatic diamines: 2,4-diethyl-, 2,4-dimethyl-1,3-phenylenediamine, 2,4-diethyl-6-methyl-, 2-methyl-4,6-diethyl-1,3-phenylenediamine, 2,4,6-triethyl-1,3-phenylenediamine-, 2,4-dimethyl-6-tert.-butyl-2,4-dimethyl-6-isooctyl- and 2,4-dimethyl-6-cyclohexyl-1,3-phenylenediamine, as well as 3,5-dimethyl-3',5'-diisopropyl- and 3,3',5,5'-tetra-isopropyl-4,4'-diamino-diphenylmethane, and mixtures thereof.

The primary aromatic diamines (ci) can be used individually or as mixtures. For example, the mixture may be comprised of alkyl substitiuted 1,3-phenylenediamines, 3,3'-di- and/or 3,3'-5,5'-tetralkyl substituted 4,4'-diamino-diphenylmethanes.

Examples of secondary aromatic diamines (cii) are: N,N'-dialkyl substituted aromatic diamines, which can optionally be substituted by an alkyl radical on the aromatic ring, having from about 1 to 20, preferably from about 1 to 4 carbon atoms in the N-alkyl radical, like for example N,N'-diethyl-, N,N'-di-sec-pentyl-, N,N'-di-sec-hexyl-, N,N'-di-sec-decyl-, N,N'-dicyclohexyl-p- respectively m-phenylenediamine, N,N'-dimethyl-, N,N'-diethyl-, N,N'-diisopropyl-, N,N'-di-sec-butyl-, N,N'-dicyclohexyl-4,4'-diamino-diphenylmethane and N,N'-di-sec-butyl-benzidine, and mixtures thereof.

The following are examples of multivalent alcohols and/or polyoxyalkylene polyols (ciii): aliphatic and/or arylaliphatic diols having from about 2 to 14, preferably from about 2 to 6 carbon atoms, like 1,3-propanediol, 1,10-decanediol, diethylene glycol, dipropylene glycol, bis-(2-hydroxyethyl)-hydroquinone and preferentially ethylene glycol, 1,4-butanediol and 1,6-hexanediol; triols like glycerine and trimethylolpropane, and lower molecular polyoxyalkylene polyols based on ethylene oxide and/or 1,2-propylene oxide and the previously stated initiator molecules. The multivalent alcohols and/or polyoxyalkylene polyols (ciii) may be used individually or as mixtures.

The chain extender (c) can be used individually or as mixtures, and are used in quantities of from about 5 to 50 parts by weight, preferably from about 10 to 40 parts by weight and particularly from about 15 to 30 parts by weight, based on 100 parts by weight of the polyester diol (b). Inasmuch as mixtures comprised of sterically hindered primary diamines (ci) and secondary aromatic diamines (cii) and/or multivalent alcohols (ciii) may be used, they preferably contain from about 1 to 40, and more preferably from about 5 to 20 parts by weight of the component (cii) and/or (ciii) per 100 parts by weight of the component (ci). Most preferably used as a chain extending agent are lower molecular diols (ciii) and/or aromatic diamines (ci), which contain, in bonded form, at least one alkyl radical in the ortho position relative to the amino groups.

The most prefered catalysts (d) are those compounds which strongly accelerate the reaction of the polyester polyol (b) and the optionally hydroxyl group containing compounds of the components (cii) with the polyisocyanates. Examples are organic metal compounds, preferably organic tin compounds, selected from the group consisting of tin(II)salts of organic carboxyic acids, for example, tin(II)acetate, tin(II)octoate, tin(II)ethylhexoate and tin(II)laurate and mixtures thereof and the dialkyl tin(IV)salts of organic carboxylic acids, for example dibutyl tin-diacetate, dibutyl tin-dilaurate, dibutyl tin-maleate and dioctyl tin-diacetate and mixtures thereof. The organic metal compounds can be used individually or preferably in combination with strongly basic amines. Examples of strongly basic amines are amidines, such as 2,3-dimethyl-3,4,5,6-tetrahydropyrimidine, tertiary amines such as triethylamine, tributylamine, dimethylbenzylamine, N-methyl-, N-ethyl-, N-cyclohexylmorpholine, N,N,N',N'-tetramethylethylenediamine, and N,N,N',N'-tetramethyl-butanediamine, pentamethyl-diethylenetriamine, tetramethyl-diamino-ethylether, bis-(dimethylaminopropyl)-urea, dimethylpiperazine, 1,2-dimethylimidazol, 1-aza-bicyclo[3.3.0]octane and preferably 1,4'di-aza-bicyclo[2.2.2]octane and mixtures thereof. Alkanol compounds like triethanolamine, triisopropanol amine, N-methyl- and N-ethyl-diethanolamine and dimethyl-ethanolamine, and mixtures thereof, are also useful.

Suitable additional catalysts are: tris-(dialkylaminoalkyl)-s-hexahydrotriazines, in particularly tris-(N,N-dimethylaminopropyl)-s-hexahydrotriazine, tetraalkyl ammonium hydroxides, like tetra-methyl ammonium hydroxide, alkali hydroxides, such as sodium hydroxide and alkali alcoholates, such as sodium-methylate and potassium isopropyplate as well as alkali salts of long chain fatty acids having from about 10 to 20 carbon atoms and optionally lateral positioned OH groups. Preferably, from about 0.001 to 5 weight percent, and more preferably from about 0.05 to 2 weight percent of catalyst and/or catalyst combination, based on the weight of the (b) component is used.

Among the blowing agents (e) which can be used in the said process is water, which reacts with the isocyanate groups to form carbon dioxide. The amount of water which is used is from about 0.5 to 2 weight percent based on the weight of the (b) component.

Other blowing agents used are low boiling point liquids which evaporate as a result of the exothermic addition polymerization reaction. Such liquids are inert in the organic polyisocyante and possess boiling points under about 100° C. Examples of the liquids preferably used are halogenated hydrocarbons like methylene chloride, trichlorofluoromethane, dichloro-difluoromethane, dichloro-monofluoromethane, dichloro-tetrafluoroethane and 1,1,2-trichloro-, 1,2,2-trifluoromethane, and mixtures thereof.

In addition, mixtures of these low boiling point liquids can be used together and/or with other substituted or unsubstituted hydrocarbons.

The quantity of low boiling point liquid useful in preparing cellular polyurethane molded articles or polyurethane-polyurea molded articles depends on the desired density as well as the optional co-use of water. Generally amounts of from about 0.5 to 15 parts by weight, based on 100 parts by weight of the (b) component, are used.

Optionally, an auxiliary agent and/or additive (f) can be incorporated into the reaction mixture. Examples are: surfactants, internal mold release agents, foam stabilizers, cell regulators, fillers, colorants, pigments, flame retardants, agents protecting against hydrolysis, fungistatic agents, bacteriostatic agents, and mixtures thereof.

Compounds considered as surfactants are those which serve to support the homogenation of the initial components and are also optionally suited in regulating the cell structure. Typical examples are emulsifiers like the sodium salts of ricinoleic sulfates or of fatty acid as well as salts of fatty acids with amines, for example, oleic diethylamine or stearic diethanolamine, salts of sulfonic acids, for example alkali salts or ammonium salts of dodecylbenzine- or dinaphthyl-methane sulfonic acids, ricinoleic acids and mixtures thereof; foam stabilizers like siloxane-oxyalkylene-mixed polymers and other organic polysiloxanes, oxyethylated alkyl phenols, oxyethylated fatty alcohols, paraffin oils, castor oil or castor oil ester and Red Turkey oil and cell regulators like paraffins, fatty alcohols and dimethyl polysiloxanes, and mixtures thereof. The surfactants are generally used in amounts of from about 0.01 to 5 weight percent based on 100 parts by weight of the (b) component.

Particularly suited as internal mold release agents are carboxylic esters and/or carboxylic amides, which are prepared through the esterification or amidation of a mixture comprised of montanic acid and at least one aliphatic carboxylic acid having at least about ten carbon atoms with at least difunctional alkanol amines, polyols, and/or polyamines having molecular weights of from about 60 to 400.

Fillers are understood to mean known conventional organic and inorganic fillers, reinforcing agents, weight increasing agents, substances for improving wear in paints, coatings, and mixtures thereof. The particular fillers should have a reinforcing effect. Typical examples are: inorganic fillers like silicate minerals, for example fiberous silicates like antigorite, serpentine, horn blends, amphiboles, crystallite, talcum; metal oxides such as kaolin, aluminum oxides, titanium oxides and iron oxides, metal salts such as chalk, heavy spar and inorganic pigments like cadmium sulfide, zinc sulfide, as well as glass, asbestos powder, and mixtures thereof. Preferably used are kaolin (china clay), aluminum silicate, and co-precipitates of barium sulfate and aluminum silicate as well as natural and synthetic fiberous minerals such as asbestos, wool astonite and particularly glass fibers of various lengths which optionally also can be sized, and mixtures thereof. Typical organic fillers are for example: coal, melamine, pine resin, cyclopentadiene resins and graft polymers based on sytrene-acrylnitrile, which are prepared through in-situ polymerization of acrylnitrile-styrene mixtures and polyetherols as disclosed in U.S. Pat. Nos. 3,304,273; 3,383,351; 3,523,093; (German Pat. Nos. 1,111,394; 1,222,669; 1,152,536); (GB No. 1,040,452 and 1,152,537); (GB No. 987,618), as well as filler-polyoxyalkylene polyols, which in aqueous polymer dispersions are converted into polyoxyalkylene polyol dispersions, and mixtures thereof.

The inorganic and organic fillers can be used individually or as mixtures. Stable filler polyoxyalkylene polyol dispersions, in which the fillers have been reduced in size in the presence of polyoxyalkylene polyols in-situ with high localized energy densities to a particle size smaller than about 7 micrometers and have hereby been dispersed at the same time are the preferred fillers.

The inorganic and organic fillers are incorporated into the reaction mixture in amounts of from about 0.5 to 50 weight percent, and preferably from about 1 to 40 weight percent based on the weight of the components (a) through (c).

Suitable flame retardants are tricresyl-phosphate, tris-2-chloroethyl-phosphate, tris-chloropropyl-phosphate and tris-2,3-dibromopropyl-phosphate, and mixtures thereof.

In addition to the already mentioned halogen substituted phosphates, inorganic flame retardants may also be used to make the molded parts flame resistant. Examples are aluminum hydroxide, antimony trioxide, arsenic oxide, ammonium polyphosphate, calcium sulfate and mixtures thereof. Generally from about 5 to 50 parts by weight, preferably from about 5 to 25 parts by weight of the said flame retardant for each 100 parts by weight the (b) component are used.

Further information concerning the other above mentioned common auxiliary agents and additives can be found in the technical literature such as the monograph of J. H. Saunders and K. C. Frisch, *High Polymers*, vol.XVI, *Polyurethanes*, Parts 1 and 2, Interscience Publishers 1962 to 1964.

In preparing the optionally cellular polyurethane molded articles or polyurethane-polyurea molded articles, the organic polyisocyanate (a) polyester-polyol (b) and chain extending agent (c) are reacted in such quantities that the equivalent ratio of NCO groups of the polyisocyanate (a) to the total of the reactive hydrogen atoms from the (b) and (c) components is from about 1:0.85 to 1:1.15, and preferably from about 1:0.95 to 1:1.15.

Noncellular and preferably cellular molded articles may be prepared using the prepolymer process or preferably using the one-shot process, whereby polyurethane molded articles are prepared with the help of low pressure techniques, and whereby the polyurethane-polyurea molded articles are prepared with the help of reaction injection molding techniques.

These types of processing techniques are described by Piechota and Rohr in *Integral Skin Foam*, Carl-Hanser-Verlag Publishers, Munich, Vienna, 1975; D. J. Prepelka and J. L. Wharton in *Journal of Cellular Plastics*, March/April 1975, pages 87 through 98 and U. Knipp in *Journal of Cellular Plastics*, March/April 1973, pages 76 to 84.

When using a mixing chamber which has several feed nozzles, the basic components may be fed in individually and mixed intensively in the mixing chamber. It has been found particularly effective to work with a two-component process. Specifically, the chain extending agent (c) and catalyst (d) are dissolved in the polyester polyol (b), and optionally with a blowing agent (e) to from the (A) component. Auxiliaries and/or additives (f) may be incorporated into the (A) component. The organic, optionally modified polyisocyanate represents the (B) component. The components are set forth in the examples. An advantage in this method is that the components (A) and (B) can be stored separately and transported in a space-saving manner, and that only the appropriate amounts must be mixed together during processing.

The amount of reaction mixture injected into the mold is measured so that the resulting noncellular molded articles have a densitiy of from about 1.0 to 1.4 g/cm$^3$, preferably of from about 1.0 to 1.2 g/cm$^3$ and the cellular molded articles have a density of from about 0.2 to 1.1 g/cm$^3$, whereby the microcellular molded articles preferably have a density of from about 0.8 to 1.0 g/cm$^3$, shoe soles have a density of from about 0.4 to 0.65 g/cm$^3$ and the cellular plastics have a density from about 0.25 to 0.4 g/cm$^3$. The initial components are put into a mold at a temperature of from about 15° to 80° C., preferably from about 20° to 60° C. and most preferably from about 25° to 55° C. The desired mold temperature is from about 20° to 100° C., and preferably from about 30° to 80° C. The degree of compression in preparing the microcellular or cellular molded articles lies between about 1.1 and 8, and preferably between about 1 and 8.

The noncellular and/or cellular isocyanate addition polymer molded articles obtained through the process of this invention are suited for use in the automobile industry, particularly as bumper coverings, impact protection moldings and body parts such as drip moldings, fenders, spoilers, and wheel house extensions as well as engineering housing components, rollers and shoe soles. The cellular foams may be used as arm rests, head rests, safety coverings in the interior of automobiles as well as for motorcycle and bicycle saddles and for coverings in composite foams.

The parts cited in the following examples refer to parts by weight.

Preparation of the Polyester Polyols Used According to this Invention

Polyester Polyol I 36.8 parts of adipic acid and 72.25 parts of a polyoxytetramethylene glycol mixture having an average OH number of 464 were mixed together. While stirring at normal pressure and while distilling off the condensation water, the reaction mixture was heated constantly to a temperature up to 220° C., and in turn esterfied. Toward the end of the esterification, the pressure was reduced to approximately 10 mbar. After separating about 9.1 parts of distillate, one obtained a polyester-diol liquid at room temperature having the following characteristic data:
OH No.: 56.3
Acid No.: 0.8
Viscosity at 25° C.: 3,320 m.Pa.s
Viscosity at 75° C.: 320 m.Pa.s Polyester Polyol II 48.9 parts of adipic acid, 45.9 parts of a polyoxytetramethylene glycol mixture having an average OH number of 469 and 17.3 parts of 1,4-butanediol were esterfied analogous to the above described procedure for polyester-diol I. A polyester-diol having the following characteristic data was obtained:
OH No.: 56.3
Acid No.: 0.7
Viscosity at 25° C.: 4,410 m.Pa.s
Viscosity at 75° C.: 441 m.Pa.s Comparative Polyester Polyol 73.49 parts of adipic acid, 33.2 parts of 1,4-butanediol and 11.4 parts of ethylene glycol were esterfied analogous to the above described procedure for polyester-diol I. 18.1 parts of water was separated as distillate.

The polyester polyol which was solid at room temperature possessed the following characteristic data:
OH No.: 56.5
Acid No.: 0.5
Viscosity at 25° C.: -
Viscosity at 75° C.: 693 m.Pa.s

EXAMPLE 1

A Component

A mixture comprised of:
82.83 parts of polyester polyol I,
8.95 parts of ethylene glycol,
3.68 parts of an antistatic agent (CATAFOR ® CA 100),
1.00 parts of a 33 weight percent solution of triethylene diamine in ethylene glycol
0.16 parts of silicone oil (Dow Corning 193),
1.80 parts of trichloro-trifluoroethane, and
0.27 parts of water.

B Component

A quasi-prepolymer having an NCO content of 19 weight percent, prepared by reaction of 4.4'-diphenylmethane-diisocyanate with a 1,4-butanediol-polyadipate with an OH number of 56.
100 parts of A Component and
(a) 92 parts
(b) 93 parts and
(c) 94 parts
of the B Components were heated to 45° C., and with the help of a low pressure machine of the type F 20 from Elastogran-Maschinenbau, Inc., were reacted in an aluminum mold heated to 50° C., whose inner dimensions were 200×200×10 mm, to form molded panels having a density of 0.65 g/cm$^3$.

The mechanical properties measured on the molded panels before and after the hydrolysis test (1 week at 70° C. and at 100 percent relative humidity) are summarized in Table I.

EXAMPLE 2

A Component

A mixture comprised of:
82.83 parts of polyester polyol II
8.95 parts of ethylene glycol,
3.68 parts of an antistatic agent (CATAFOR ® CA 100),
1.00 parts of a 33 weight percent solution of triethylene diamine and ethylene glycol,
0.16 parts of silicone oil (Dow Corning 193),
1.80 parts of trichloro-trifluoroethane, and
0.27 parts of water.

B Component

Analogous to Example 1 100 parts of the A Components and
(a) 93 parts
(b) 94 parts and
(c) 95 parts
of the B Components were reacted analogous to the specifications of Example 1 to form molded panels having a density of 0.65 g/cm³.

The mechanical properties measured on the molded panels before and after the hydrolysis test (1 week at 70° C. and at 100 percent relative humidity) are summarized in Table 2.

COMPARATIVE EXAMPLE

A Component

A mixture comprised of:
84.33 parts of the comparative polyester polyol,
8.95 parts of ethylene glycol,
3.68 parts of an antistatic agent (CATAFOR® CA 100)
1.00 parts of a 33 weight percent solution of triethylene diamine and ethylene glycol
0.16 parts of silicone oil (Dow Corning 193),
1.80 parts of trichloro-trifluoroethane and
0.08 parts of water.

B Component

Analogous to Example 1 100 parts of A Component and
(a) 92 parts
(b) 93 parts and
(c) 94 parts
of the B components were reacted analagous to the specifications of Example 1 into molded panels having a density of 0.65 g/cm³.

The mechanical properties measured on the molded panels before and after the hydrolysis test (1 week at 70° C. and at 100 percent relative humidity) are summarized in Table 3.

TABLE I

| Example 1 | a | after Hydrolysis | b | after Hydrolysis | c | after Hydrolysis |
|---|---|---|---|---|---|---|
| Shore A Hardness according to DIN 53 505 | 75 | — | 78 | — | 78 | — |
| Tensile Strength at N/mm² Break according to DIN 53 504 | 8.2 | 5.50 | 9.0 | 7.0 | 9.5 | 8.0 |
| Percentage Elongation % at Break according to DIN 53 504 | 418 | 470 | 411 | 495 | 402 | 505 |
| Tear Propagation N/mm² Strength according to Graves and according to DIN 53 515 | 12.6 | 12.6 | 12.2 | 13.9 | 11.9 | 15.0 |
| Repeated Flexural Behavior with reference to DIN 53 222 (after 30,000) | 1 | break | 1 | 1 | 1 | 1 |

[1] satisfactory

TABLE II

| Example 2 | a | after Hydrolysis | b | after Hydrolysis | c | after Hydrolysis |
|---|---|---|---|---|---|---|
| Shore A Hardness according to DIN 53 505 | 75 | — | 75 | — | 76 | — |
| Tensile Strength at N/mm² Break according to DIN 53 504 | 8.2 | 3.2 | 8.6 | 5.8 | 9.3 | 6.9 |
| Percentage Elongation % at Break according to DIN 53 504 | 474 | 365 | 431 | 517 | 402 | 510 |
| Tear Propagation N/mm² Strength according to Graves and according to DIN 53 515 | 11.3 | — | 11.3 | — | 9.5 | — |
| Repeated Flexural Behavior with reference to DIN 53 222 (after 30,000) | 1 | break | 1 | 1 | 1 | 1 |

[1] satisfactory

TABLE III

| Comparative Example | a | after Hydrolysis | b | after Hydrolysis | c | after Hydrolysis |
|---|---|---|---|---|---|---|
| Shore A Hardness according to DIN 53 505 | 75 | — | 75 | — | 77 | — |
| Tensile Strength at N/mm² Break according to DIN 53 504 | 10.8 | 6.7 | 10.4 | 7.5 | 10.7 | 7.8 |
| Percentage Elongation % at Break according to DIN 53 504 | 423 | 475 | 393 | 441 | 385 | 427 |
| Tear Propagation N/mm² | 10.3 | — | 9.8 | — | 8.8 | — |

TABLE III-continued

| Comparative Example | a | after Hydrolysis | b | after Hydrolysis | c | after Hydrolysis |
|---|---|---|---|---|---|---|
| Strength according to Graves and according to DIN 53 515 Repeated Flexural Behavior with reference to DIN 53 222 (after 30,000) | 1 | break | 1 | break | break | >9 |

[1] satisfactory

The embodiments of the invention in which an exclusive property or privilege is claimed are defined as follows:

1. A process for the preparation of an elastic, noncellular and/or cellular isocyanate addition polymer molded article comprising reacting:
   (a) An organic polyisocyanate;
   (b) A high molecular weight polyester polyol;
   (c) A chain extending agent in the presence of;
   (d) A catalyst
wherein the polyester polyol (b) is liquid at room temperature, has a hydroxyl number from about 25 to 100, an acid number less than about 2 and is produced through the polycondensation of organic dicarboxylic acids and/or anhydrides and polyoxytetramethylene glycol mixtures having a molecular weight of from about 200 to 300.

2. The process of claim 1 wherein the polyester polyol is produced through the polycondensation of adipic acid and at least one polyoxytetramethylene glycol having a molecular weight from about 200 to 300.

3. The process of claim 1 wherein the polyester polyol is produced through the polycondensation of a mixture of at least one polyoxytetramethylene glycol having a molecular weight from about 200 to 300 and at least one alkane diol.

4. The process of claim 1 wherein the polyester diol is produced through the polycondensation of
   (a) about 20 to 50 parts by weight of adipic acid,
   (b) about 10 to 90 parts by weight of at least one polyoxytetramethylene glycol having a molecular weight from about 200 to 300, and
   (c) about 0 to 50 parts by weight of 1,4-butane-diol.

5. The process of claim 1 wherein a quasi-prepolymer having an NCO content from about 15 to 30 percent by weight based on the entire weight is used as the organic polyisocyanate, said quasi-prepolymer produced through the reaction of 4,4'-diphenylmethane diisocyanate with at least one polyester diol having a hydroxyl number from about 30 to 300 or from a mixture of a polyester diol having a hydroxyl number from about 30 to 300, and at least one alkane diol having about 2 to 12 carbon atoms and the alkylene radical.

* * * * *